April 8, 1941.  T. L. FAWICK  2,237,864
CLUTCH OR THE LIKE
Filed Dec. 13, 1939

INVENTOR
Thomas L. Fawick
BY
Willard D. Eakin
ATTORNEY

Patented Apr. 8, 1941

2,237,864

UNITED STATES PATENT OFFICE 2,237,864

CLUTCH OR THE LIKE

Thomas L. Fawick, Akron, Ohio

Application December 13, 1939, Serial No. 309,005

10 Claims. (Cl. 192—88)

This invention relates primarily to clutches, although some of its features are applicable also to brakes.

Some of its features are disclosed and, in some instances, more broadly claimed in my Letters Patent No. 2,111,422, granted March 15, 1938; No. 2,141,645, granted December 27, 1938; No. 2,213,000, granted August 27, 1940; No. 2,214,164, granted September 10, 1940, and in my copending applications Ser. No. 101,638, filed September 19, 1936; Ser. No. 131,656, filed March 18, 1937; Ser. No. 158,592, filed August 11, 1937.

The chief objects of the present invention are to provide a clutch of the distensible-bag type in which centrifugal force will assist in clutch-disengagement; to provide quickness of action in engagement and disengagement of the frictionally-engaging members; to provide for actuation of the clutch or the like without requiring the ingress or egress of a large amount of actuating fluid; to provide against excessively sharp flexure of the walls of the bag; to provide ready adjustability as to the amount of clearance between the frictional members in their disengaged relation; and to provide ready adjustability as to the amount of ingress and egress of fluid required for engagement and disengagement of the frictionally engaging members.

Figure 1:
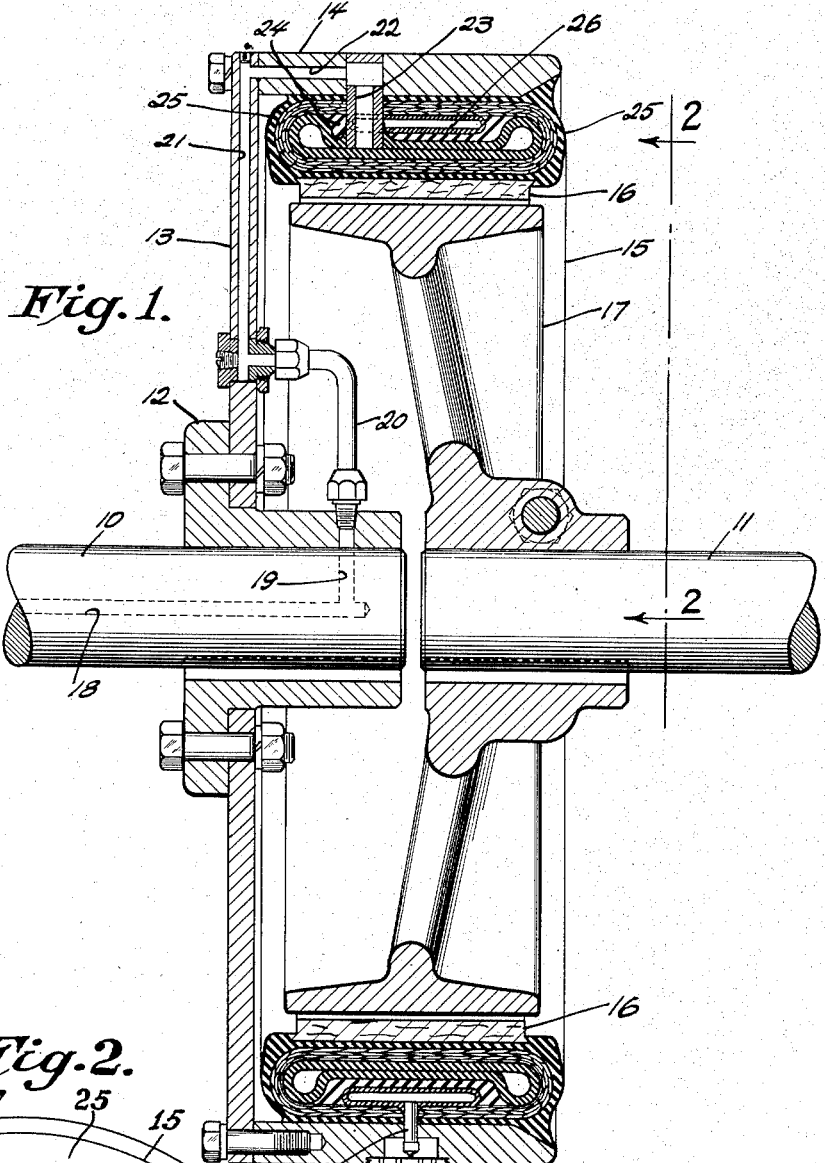

Fig. 1 of the accompanying drawing is an axial section of a clutch embodying my invention in its preferred form.

Figure 2:
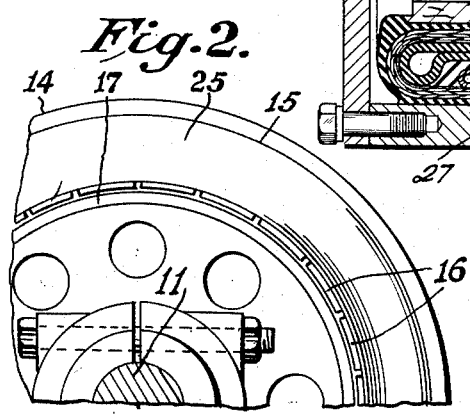

Fig. 2 is a fragmentary end elevation of the same, from the right of Fig. 1.

Referring to the drawing, the assembly comprises a pair of at least substantially aligned shafts 10 and 11 in series, either of which may be the driving, and the other the driven, shaft. In the following description it will be assumed that 10 is the driving shaft and that the members 12, 13 and 14 constitute a fly-wheel mounted thereon.

Secured as by vulcanization to the inner, annular face of the member 14, is an annular bag 15, preferably of cord-reinforced rubber, which has secured to the inner, annular face of its inwardly bayed portion, as by vulcanization, a circumferential series of wear members 16, 16 adapted for frictional driving engagement with the outer, annular face of a male clutch-member 17 which is secured upon the shaft 11.

The annular bag 15 in cross-sectional form is elongated axially of the assembly, for large effective area of fluid pressure for holding the frictional members in engagement, and is of short radial dimension for actuation by small ingress and egress of fluid, through a conduit which comprises bores 18, 19 in the shaft 10, a pipe 20, a bore 21 in the member 13, a bore 22 in the member 14, and a bag stem 23 through which the bore 22 is in communication with the interior of the bag.

The bag 15 is formed with an internal rubber filler and stop portion 24 having a wide, transversely flat inner face adapted to contact the internal face of the portion of the bag on which the wear members 16 are mounted, the filler member thus being adapted to serve as a stop for that portion of the bag when it is moved outwardly from the axis of the assembly, as by centrifugal force, in disengaging of the clutch.

The filler-and-stop member 24 thus provides the advantages of small fluid-flow requirement and also prevents the bag wall from being flexed too sharply at its side-wall bulges 25, 25.

Preferably the filler-and-stop member or portion 24 is of hollow construction, with a fluid-tight lining tube 26 adapted to receive a harmless distending fluid such as castor oil, glycerine or the like, through a filling stem 27 (shown at the lowermost part of the drawing). This provides for adjustment as to the effective radial depth of the filler-and-stop portion 24, for initial adjustment and for compensation for wear of the frictionally engaging surfaces.

In the operation of the device, induction of pressure fluid into the bag distends it radially inward, toward the axis of rotation, and thus causes the members 16 to engage the male clutch member 17.

Upon release of the fluid pressure not only the resilience of the bag but also centrifugal force of its inwardly distended portion and also that of the members 16 act to effect quick and complete disengagement of the clutch.

Compensation for wear is had by forcing additional fluid into the lining member 26 through the filling stem 27.

Modifications are possible within the scope of the invention as defined by the appended claims.

I claim:

1. The combination of two relatively rotatable structures adapted for torque-sustaining engagement with each other, said combination comprising an inner member having an outer, annular, frictional-engagement face, an outer member surrounding the same, and a flexible, fluid-retaining, torque-transmitting member mounted on the outer member and having an inwardly bayed inner peripheral portion adapted to be further distended inwardly for frictional engagement with the inner member, said flexible member comprising oppositely bulged torque-transmitting side-walls which are unconfined and freely-flexing in service.

2. The combination of two relatively rotatable structures adapted for torque-sustaining engagement with each other, said combination comprising an inner member having an outer, annular, frictional-engagement face, an outer member surrounding the same, and a flexible, fluid-retaining, torque-transmitting member mounted on the outer member and having an inwardly bayed inner peripheral portion adapted to be further distended inwardly for frictional engagement with the inner member, said flexible member having oppositely bulged, torque-transmitting side-walls which are unconfined and freely-flexing in service and wear members mounted on its inner peripheral face.

3. The combination of two relatively rotatable structures adapted for torque-sustaining engagement with each other, said combination comprising an inner member having an outer, annular, frictional-engagement face, an outer member surrounding the same, a flexible, fluid-retaining, torque-transmitting member mounted on the outer member and having an inwardly bayed inner peripheral portion adapted to be further distended inwardly for frictional engagement with the inner member, and filler means extending into the fluid-receiving space defined by the inwardly bayed portion of the flexible member.

4. The combination of two relatively rotatable structures adapted for torque-sustaining engagement with each other, said combination comprising an inner member having an outer, annular, frictional-engagement face, an outer member surrounding the same, a flexible, fluid-retaining, torque-transmitting member mounted on the outer member and having an inwardly bayed inner peripheral portion adapted to be further distended inwardly for frictional engagement with the inner member, and filler means extending into the fluid-receiving space defined by the inwardly bayed portion of the flexible member, said filler means being formed with a surface adapted to serve as a stop for the inner peripheral portion of the flexible member upon outward movement of the latter.

5. The combination of two relatively rotatable structures adapted for torque-sustaining engagement with each other, said combination comprising an inner member having an outer, annular, frictional-engagement face, an outer member surrounding the same, a flexible, fluid-retaining, torque-transmitting member mounted on the outer member and having an inwardly bayed inner peripheral portion adapted to be further distended inwardly for frictional engagement with the inner member and filler means extending into the fluid-receiving space defined by this inwardly bayed portion of the flexible member, said filler means being formed with a surface adapted to serve as a stop for the inner peripheral portion of the flexible member upon outward movement of the latter, and the flexible member having bulged side-walls.

6. The combination of two relatively rotatable structures adapted for torque-sustaining engagement with each other, said combination comprising an inner member having an outer, annular, frictional-engagement face, an outer member surrounding the same, a flexible, fluid-retaining, torque-transmitting member mounted on the outer member and having an inwardly bayed inner peripheral portion adapted to be further distended inwardly for frictional engagement with the inner member, filler means extending into the fluid-receiving space defined by the inwardly bayed portion of the flexible member, the filler means being hollow and flexible, and a fluid in the hollow filler means.

7. The combination of two relatively rotatable structures adapted for torque-sustaining engagement with each other, said combination comprising an inner member having an outer, annular, frictional-engagement face, an outer member surrounding the same, a flexible, fluid-retaining, torque-transmitting member mounted on the outer member and having an inwardly bayed inner peripheral portion adapted to be further distended inwardly for frictional engagement with the inner member, filler means extending into the fluid-receiving space defined by the inwardly bayed portion of the flexible member, the filler means being hollow and flexible, and means for conducting a fluid into it.

8. The combination of two relatively rotatable structures adapted for torque-sustaining engagement with each other, one of said structures comprising a fluid-container adapted to be distended for effecting such engagement, and a second fluid-container constituting a space-filler member for restricting the range of distension of the first mentioned fluid container.

9. The combination of two relatively rotatable structures adapted for torque-sustaining engagement with each other, one of said structures comprising a fluid-container adapted to be distended for effecting such engagement, a second fluid-container constituting a space-filler member, the two said fluid containers being integrally formed, and means for conducting fluid to the fluid-containers respectively.

10. The combination of two relatively rotatable structures adapted for torque-sustaining engagement with each other, one of said structures comprising a fluid-container adapted to be distended for effecting such engagement, a second fluid container constituting a space-filler member, and means for conducting fluid to the fluid-containers respectively, the fluid conducting means of one of the containers extending through a part of the other container.

THOMAS L. FAWICK.